US011227114B1

(12) United States Patent
Yurtsev et al.

(10) Patent No.: US 11,227,114 B1
(45) Date of Patent: Jan. 18, 2022

(54) NATURAL LANGUAGE INTERFACE WITH REAL-TIME FEEDBACK

(71) Applicant: Kensho Technologies, LLC, Cambridge, MA (US)

(72) Inventors: Eugene Yurtsev, Cambridge, MA (US); Leonid Taycher, Newton, MA (US); Michael Shulman, Somerville, MA (US); Georg Kucsko, Cambridge, MA (US); Robert Assaly, New York, NY (US); Eli Rosen, Jamaica Plain, MA (US)

(73) Assignee: Kensho Technologies, LLC, Cambridge, MA (US)

( * ) Notice: Subject to any disclaimer, the term of this patent is extended or adjusted under 35 U.S.C. 154(b) by 224 days.

(21) Appl. No.: 16/446,145

(22) Filed: Jun. 19, 2019

Related U.S. Application Data

(60) Provisional application No. 62/772,520, filed on Nov. 28, 2018.

(51) Int. Cl.
*G06F 40/284* (2020.01)
(52) U.S. Cl.
CPC ................. *G06F 40/284* (2020.01)
(58) Field of Classification Search
None
See application file for complete search history.

(56) References Cited

U.S. PATENT DOCUMENTS

| 7,324,936 | B2* | 1/2008 | Saldanha | G06F 16/258 704/9 |
| 9,824,083 | B2* | 11/2017 | Ghannam | G06F 40/30 |
| 10,083,227 | B2* | 9/2018 | Valentin | G06F 16/332 |
| 2010/0023514 | A1* | 1/2010 | Parikh | G06F 40/242 707/E17.001 |
| 2012/0254143 | A1* | 10/2012 | Varma | G06F 40/30 707/706 |

(Continued)

OTHER PUBLICATIONS

Sathick, K. Javubar, and A. Jaya. "Natural language to SQL generation for semantic knowledge extraction in social web sources." Indian Journal of Science and Technology 8, No. 1 (2015): 1. (Year: 2015).*

(Continued)

*Primary Examiner* — Frank D Mills
(74) *Attorney, Agent, or Firm* — Fish & Richardson P.C.

(57) ABSTRACT

Methods, and systems for a natural language interface with real-time feedback. One of the methods includes receiving an n-gram of characters; identifying a first prefix token within the n-gram of characters; identifying a plurality of possible interpretations of the n-gram of characters; for each possible interpretation, attaching the first prefix token to a token sequence; removing the first prefix token from the n-gram of characters to produce an n-gram remainder; identifying a second prefix token within the n-gram remainder using a tokenizer; identifying a plurality of remaining possible interpretations based on the first prefix token and the second prefix token; for each remaining possible interpretation attaching the second prefix token to a token sequence; applying grammatical rules to each token sequence to determine that each token sequence is valid; and forwarding interpretation data associated with at least one valid token sequence.

17 Claims, 6 Drawing Sheets

(56) References Cited

U.S. PATENT DOCUMENTS

| | | | | |
|---|---|---|---|---|
| 2014/0180728 | A1* | 6/2014 | Biddle | G06F 16/3329 |
| | | | | 705/4 |
| 2017/0075953 | A1* | 3/2017 | Bozkaya | G06F 16/24522 |
| 2017/0242842 | A1* | 8/2017 | Halbani | G06F 40/226 |
| 2019/0102390 | A1* | 4/2019 | Antunes | G06F 40/295 |

OTHER PUBLICATIONS

Sullivan, Danny, "How Google autocomplete Works in Search," Apr. 20, 2018, 11 pages, https://www.blog.google/products/seareh/how-google-autocomplete-works-search/.

Wiggers, Kyle, "Cline raises over $50 million to bring conversational AI to cars, banks, and kiosks," May 20, 2019, 5 pages, https://venturebeat.com/2019/05/20/clinc-raises-50-million-to-bring-conversational-ai-to-cars-banks-and-kiosks/.

\* cited by examiner chip companies 302a

TOP DESTINATIONS 306
Company Screener
Criteria: industry = Semiconductor
308 310
304

FIG. 3A american chip companies 302b

TOP DESTINATIONS 306
Company Screener
Criteria: industry = Semiconductor, geography = United States of America
308 310 312
304

FIG. 3B eps of non-american chip companies 402a

TOP DESTINATIONS 406
Company Screener 410
Criteria: industry = Semiconductor, geography ≠ United States of America 412
Additional Report Fields: Diluted Earnings Per Share – Total (ID: 3524)
408 414
404

FIG. 4A stock price, eps of non-american chip companies ⸺402b

TOP DESTINATIONS
Company Screener
Criteria: industry = Semiconductor, geography = United States of America
Additional Report Fields: Last Close Price (ID: 100052) Diluted Earnings Per Share – Total (ID: 3524)

FIG. 4B stock price, eps of market-cap of non-american chip companies ⸺402c

TOP DESTINATIONS
Company Screener
Criteria: industry = Semiconductor, geography = United States of America
Additional Report Fields: Last Close Price (ID: 100052) Diluted Earnings Per Share – Total (ID: 3524), Last Close Market Cap (ID: 100054)

FIG. 4C stock price, eps of market-cap of non-american chip companies with positive revenue ⸺402d

TOP DESTINATIONS
Company Screener
Criteria: industry = Semiconductor, Total Revenues (ID: 28) > 0, geography = United States of America ⸺408
Additional Report Fields: Last Close Price (ID: 100052), Diluted Earnings Per Share – Total (ID: 3524), Last Close Market Cap (ID: 100054)

NATURAL LANGUAGE INTERFACE WITH REAL-TIME FEEDBACK

CROSS-REFERENCE TO RELATED APPLICATIONS

This application claims the benefit under 35 U.S.C. § 119(e) of the filing date of U.S. Patent Application No. 62/772,520, for Natural Language Interface with Real-Time Feedback which was filed on Nov. 28, 2018, and which is incorporated here by reference in its entirety.

BACKGROUND

Technical Field

This specification relates to systems and methods for providing a natural language interface.

Background

Information retrieval systems often allow a user to enter a natural language search into a query field. Such information retrieval systems then return results. The user reviews the results to see if they are relevant to what the user was seeking. Often the user will run multiple searches to find the information being sought.

SUMMARY

This specification describes technologies for a natural-language interface with real-time feedback. In general, one innovative aspect of the subject matter described in this specification can be embodied in methods that include the actions of: receiving by a computing device an n-gram of characters; identifying a first prefix token within the n-gram of characters; identifying a plurality of possible interpretations of the n-gram of characters based at least in part on the first prefix token; for each possible interpretation, attaching the first prefix token to a token sequence associated with a tokenization path; removing the first prefix token from the n-gram of characters to produce an n-gram remainder; identifying a second prefix token within the n-gram remainder using a tokenizer; identifying a plurality of remaining possible interpretations based on the first prefix token and the second prefix token; for each remaining possible interpretation attaching the second prefix token to a token sequence; applying grammatical rules to each token sequence to determine that each token sequence is valid; and forwarding, for display to a user, interpretation data for at least one valid token sequence.

The method can further include (a) removing a further prefix token (e.g., a second prefix token, a third prefix token, etc.) from the n-gram remainder to produce a reduced n-gram remainder; (b) identifying a next prefix token within the reduced n-gram remainder using a tokenizer; (c) identifying a plurality of remaining possible interpretations based on the prefix tokens; and repeating steps (a) to (c), e.g., recursively. At the end of the parse, one implementation of the method produces a parse tree that contains various possible interpretations of the n-gram of characters (e.g., a sentence).

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by a data processing apparatus, cause the apparatus to perform the operations or actions.

The foregoing and other embodiments can each optionally include one or more of the following features, alone or in combination. In particular, one embodiment includes all the following features in combination. The interpretation data can include search criteria specified. The search criteria can include industry, geography, or other types of attributes that are known for the entities searched by systems and methods described in this specification. Such attributes can be described by a schema.

The tokenizer can be a dynamic tokenizer. The first prefix token can be a plurality of items and the items can be phonemes, syllables, letters, or words. The method can further include suggesting how to complete the n-gram of characters. Forwarding interpretation data can include: forwarding data representing at least two valid token sequences; and receiving an indication of a selection of one of the at least two valid token sequences. The method can further include determining a context for the n-gram of characters. The method can further include assembling multiple vocabularies, which when used together, can help determine the context of the n-gram of characters.

Another innovative aspect of the subject matter described in this specification can be embodied in a system that includes one or more computers and one or more storage devices, on which are stored instructions that are operable, when executed by the one or more computers, to cause the one or more computers to perform operations. The operations can include: receiving by a computing device an n-gram of characters; identifying a first prefix token within the n-gram of characters; identifying a plurality of possible interpretations of the n-gram of characters based at least in part on the first prefix token; for each possible interpretation, attaching the first prefix token to a token sequence associated with a tokenization path; removing the first prefix token from the n-gram of characters to produce an n-gram remainder; identifying a second prefix token within the n-gram remainder using a tokenizer; identifying a plurality of remaining possible interpretations based on the first prefix token and the second prefix token; for each remaining possible interpretation attaching the second prefix token to a token sequence; applying grammatical rules to each token sequence to determine that each token sequence is valid; and forwarding, for display to a user, interpretation data for at least one valid token sequence.

Yet another innovative aspect of the subject matter described in this specification can be embodied in methods that include the actions of: receiving an n-gram of characters; identifying a first prefix token within the n-gram of characters; attaching the first prefix token to a token sequence; removing the first prefix token from the n-gram of characters to produce an n-gram remainder; identifying a second prefix token within the n-gram remainder; attaching the second prefix token to the token sequence; applying a grammatical rule to the token sequence to determine that the token sequence is valid; and forwarding, for display to a user, interpretation data for the valid token sequence.

Still another innovative aspect of the subject matter described in this specification can be embodied in methods that include the actions of: a) receiving by a computing device an n-gram of characters; b) identifying an initial prefix token within the n-gram of characters; c) identifying a plurality of possible interpretations of the n-gram of characters based at least in part on the initial prefix token; d) for each possible interpretation, attaching the initial prefix token to a token sequence associated with a tokenization path; e) removing the initial prefix token from the n-gram of characters to produce an n-gram remainder; f) identifying a further prefix token within the n-gram remainder; g) identifying a plurality of remaining possible interpretations based on the initial prefix token and the further prefix token; h) for each remaining possible interpretation attaching the further prefix token to a token sequence; i) applying grammatical rules to each token sequence to expose possible interpretations by the system of such token sequence in addition to determining whether each token sequence is valid; j) forwarding, for display to a user, interpretation data for at least one valid token sequence; k) removing the further prefix token from the n-gram remainder; and l) repeating steps (f)-(k) (e.g., recursively until a user provides a response or the n-gram of characters has been parsed beyond a specified threshold).

The subject matter described in this specification can be implemented in particular embodiments so as to realize one or more of the following advantages. The user receives feedback in real time giving the user an understanding of how the system is interpreting the user's query. This feedback allows a user to make effective adjustments to a query in real-time, helping to enforce feedback between text entered and the resulting output, demystifying the system's interpretation for the user without the user having to wait for the results and infer from the results how the system interpreted the query. As a result, the user receives a better result set and the user receives the result set she is seeking faster.

Stated differently, a typical information retrieval system allows a user to enter a natural language search into a query field and the system returns results. The user then reviews the response to see if it is relevant to what the user was seeking. Often the user will run multiple searches to find the information being sought. In contrast to such a typical information retrieval system, embodiments described in this specification allow a user to understand how the system is interpreting the user search query so that the user can refine her search query to find the information she is seeking more efficiently, e.g., as a result of the first search. Such embodiments also teach a user to use the information retrieval system more efficiently in future searches.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 3A-3B illustrate an example of a natural language query with a display providing feedback to a user regarding how the query is being interpreted.

FIGS. 4A-4D illustrate another example of a natural language query with a display providing feedback to a user regarding how the query is being interpreted.

Like reference numbers and designations in the various drawings indicate like elements.

DETAILED DESCRIPTION

Figure 1:
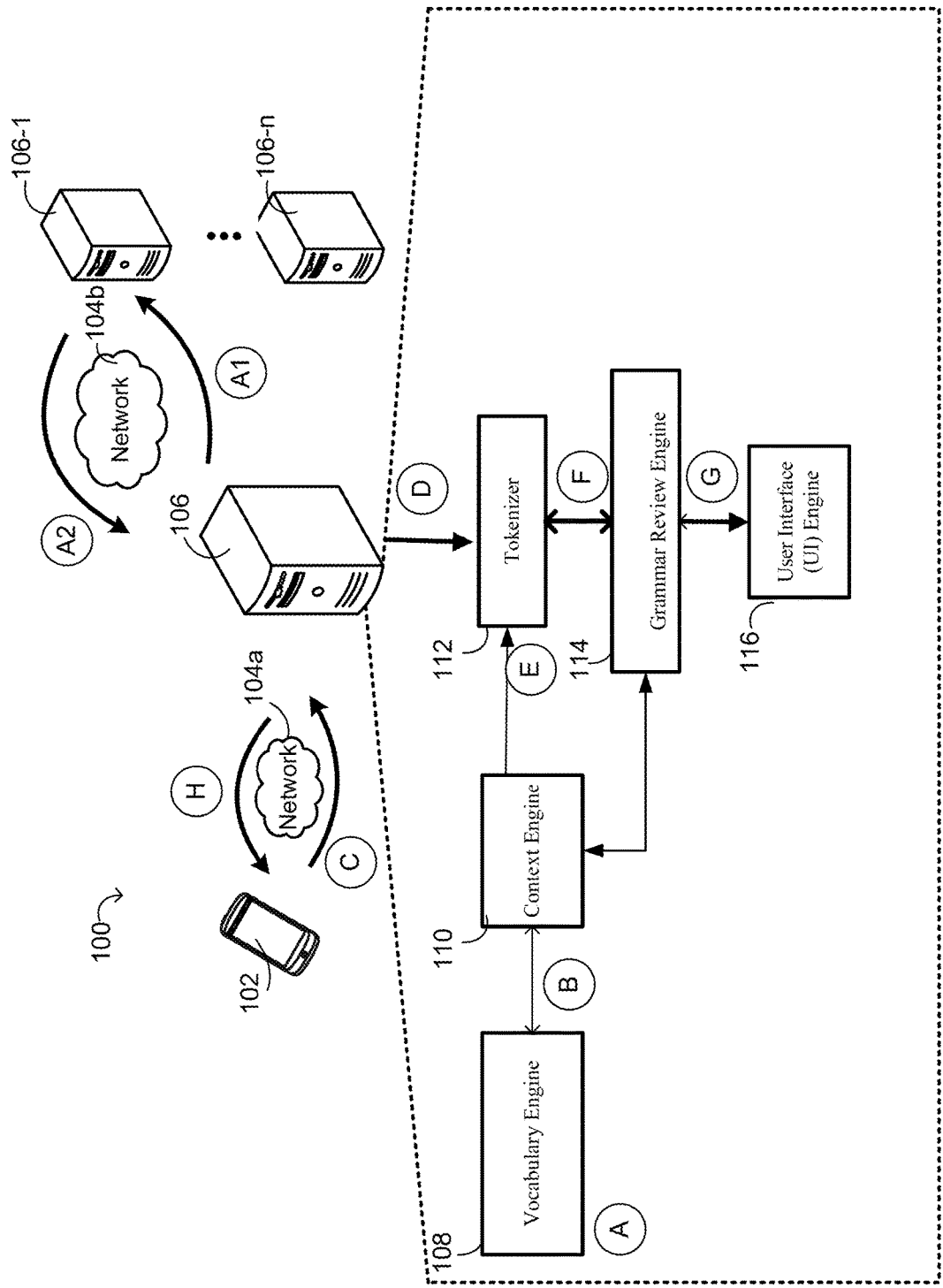
FIG. 1 is a block diagram of one example of a natural language interface with real-time feedback.

This specification describes technologies for a natural-language interface with real-time feedback (NLIRTF) system. FIG. 1 shows an example natural-language interface system 100 with real-time feedback. With reference to FIG. 1, a NLIRTF system 106, can include a vocabulary engine 108, a context engine 110, a tokenizer 112, a grammar review engine 114 and a user interface (UI) engine 116.

At step A, the vocabulary engine 108 can assemble a list of words/vocabulary that the NLIRTF system supports. The vocabulary engine 108 can associate words in a specified vocabulary with more than one meaning. For example, "or" can be interpreted as either a part of speech (a conjunction) or as referring to the state of Oregon (a geography). As another example, the word "Georgia" can be associated with either a state in the United States of America or a country. Similarly, the vocabulary engine 108 can assemble common synonyms/aliases for words that appear in the vocabulary. For example, the "United States" can be referred to as either: "US", "us", "u.s.a.", "United States of America", "the US", etc.

At steps A1 and A2, the vocabulary engine 108 can scan through various corpora, such as Wikipedia, to identify aliases. The corpora can be stored either locally or on remote computing resources, e.g., 106-1 to 106-n. If the corpora are located on remote computing resources then the vocabulary engine can scan the corpora by interacting with (e.g., by making requests to, and receiving responses from) the remote computing resources over a network 104b.

The vocabulary engine's synonym/aliases list can be built from a combination of automatic curation and automatic derivation. The vocabulary engine can find synonyms/aliases using automatic curation from various sources such as Wikipedia. For example, embodiments can determine that "Amazon" may refer to either the company "Amazon" or to the "Amazon rainforest." In one implementation this determination can be made using two different methods: (i) following redirects and (ii) looking at anchor links and disambiguation pages. The vocabulary engine can assemble many of the aliases by traversing through database redirects, e.g., Wikipedia "redirects," and through links found on Wikipedia pages to identify the different ways in which people refer to a given entity.

An example of using redirects to find synonyms is the following: submitting a search for "autonomous vehicle" in Wikipedia currently redirects to "vehicular automation." This redirect allows the system to determine that "autonomous vehicle" and "vehicular automation" are synonymous (additional meta information like page view stats can be used by the system to improve the results.)

In addition, the vocabulary engine can infer aliases by scanning text to identify words that typically appear in the same context. For example, by determining that the two words "autonomous vehicles" and "self-driving cars" typically appear in the same context, the vocabulary engine can infer that these words are synonyms.

The vocabulary engine can also use automatic derivation. Stemmers, lemmatizers, and simple heuristic rules can be used to augment a set of aliases. For example, the vocabulary engine can derive the synonym "usa" from "U.S.A." by lower-casing the synonym and removing punctuation. This type of heuristic tends to work for many abbreviations.

Stemmers and lemmatizers can help handle more user queries by allowing the system to recognize items such as "miners", "mining", and "miner" as being related to the same family of concepts.

Another way the vocabulary engine can build a vocabulary is where the information to be retrieved is known ahead of time (i.e., before a user starts to interact with the information). If a search is conducted on top of known databases, the vocabulary engine can scan the known databases to identify meaningful words (together with their context). For example, given a table detailing stock transactions, one of the columns may represent a categorical value specifying whether the order was a "limit order" or a "market order." The vocabulary engine can scan the values in such a column to extract both of these words. More importantly, the vocabulary engine can maintain detailed information about the origin of these words (e.g., which column is associated with these words) so that the engine can determine how to interpret these words.

At step B, the vocabulary engine 108 provides vocabulary data to the context engine 110. The context engine 110 can assemble a context by selecting a type of vocabulary. For example, the context engine can assemble a context for understanding questions about companies and another context for understanding questions about animals. Providing a context for company-related searches includes using a specialized vocabulary. Such a vocabulary can include words relating to industries, geographies, status of the company (public/private/defunct), the names of attributes a company can have, e.g., number of employees, total revenue, and cash flows. In addition, the context can contain common words that serve grammatical purposes (e.g., 'in', 'average of', 'outside of', and 'where is'). A context about animals can include using a vocabulary associated with animal breeds, attributes associated with animals such as their weight, height, age and fur color.

At step C, a user can start to enter a search query, e.g., an n-gram of characters into a natural language interface displayed on a user device 102. As the user types, the n-gram of characters that are entered by the user are periodically transmitted over network 104(a) to a NLIRTF system, e.g., server 106. In other words, the first letter or few characters that a user types are transmitted to the system 100 and then, as the user types further characters, an updated n-gram is transmitted with every additional character or few characters. In one implementation whenever the input changes (e.g., whenever a user inserts or removes a single character) the n-gram of characters (or some subset) is transmitted to the NLIRTF system. In another implementation, the system can enforce some debouncing rate (e.g., debounce every 50 ms). In other words, the system can wait a minimum of 50 ms before transmitting an update of the n-gram to the NLIRTF.

At step D, the n-gram of characters are received by the tokenizer 112. The tokenizer is an engine that can receive a string (e.g., a stream of characters) and return individual tokens (e.g., words or lexems). The tokenizer can be a prefix tokenizer. A prefix tokenizer identifies prefixes in a stream of characters. For example, given the stream of characters "dogandcat," the prefix tokenizer can recognize the prefix "dog". The tokenizer scans the string left to right and identifies the word "dog" (emitting it as a token) and also emitting the remainder of the stream "andcat".

One embodiment of a tokenizer applies a vocabulary based on a context. Such a tokenizer recognizes the specific vocabulary associated with the specified context. For example, a tokenizer associated with a context of searching for information related to companies can be designed to recognize the vocabulary associated with industries, geographies, the status of companies (public/private/defunct), and various other attributes of companies.

The tokenizer can be a dynamic tokenizer. A dynamic tokenizer determines the identity of the next token (e.g., how many of the next characters form a word) based on both the characters that precede and the characters that follow the proposed token and the actual token itself (e.g., its length). In contrast, a static tokenizer is a simpler tokenizer that resolves word boundaries without looking at the identity of the previous tokens that were generated, or considering information about the actual token itself. An example of a simple static tokenizer is a tokenizer that takes a stream of characters and splits the stream into words by interpreting all whitespace, commas and periods as denoting word boundaries.

A dynamic tokenizer is useful because it can handle garbled user input (e.g., input that is missing whitespace or has strange characters). For example, a dynamic tokenizer can correctly tokenize the following n-gram of characters:

"!!!!!AndFrenchcompanieswithpositiverevenue!!!!"

In certain embodiments, the tokenizer 112 can include a set of tokenizers including tokenizers that leverage regular expressions to recognize regular languages (e.g., numbers). Tokenizers with access to regular expressions are useful because the vocabulary engine cannot enumerate all possible numbers and store them in a dictionary. A regular language can be used to both recognize numbers, such as "21,433," and numbers that are spelled out, such as "one hundred and three."

When comprised of a set of tokenizers, tokenizer 112 iterates through all the tokenizers in the set and uses each tokenizer in an attempt to recognize the prefix of the n-gram. All tokens produced are considered valid, independent of the member tokenizer that emitted them.

To recognize out-of-vocabulary words, the set of tokenizers can be augmented with a specialized "backup" tokenizer. When none of the other tokenizers in the set of tokenizers is able to recognize the prefix of the n-gram, the composite tokenizer 112, uses the backup tokenizer. This backup tokenizer is responsible for simply stripping the leading character of the n-gram and emitting it as a token. The tokenizer marks this token as an unknown token. This allows the engine to mark a sequence of unknown tokens as an out-of-vocabulary word(s).

The engine can incorporate different modules to deal with out-of-vocabulary words. Many out-of-vocabulary words will simply be misspelled words. As such, the engine can incorporate a context-sensitive spelling correction module. Other out-of-vocabulary words may be valid words that are not in the known universe of words. At this stage, the engine can choose to either ignore such tokenizations, to surface such tokenizations to the user, or to attempt to predict what the out-of-vocabulary word may mean (machine learning techniques can do this based on character level models).

The tokenizers that recognize words in a dictionary can use a trie data structure. A trie is a specialized data structure that allows a system to quickly match prefixes of strings.

One popular variant of tries is a MARISA trie, which is a static memory-efficient and fast trie-like structure. Alternatively, the system can use finite state transducers to recognize prefixes of strings with simultaneous typographical corrections.

Thus, the composite tokenizer can recognize prefixes in character streams, producing a token and the rest of the stream for each recognized prefix. For example, "us companies"->United States of America+"companies"
"companies with revenue>30"->companies+"with revenue>30"
Spanishcompanies"->Spanish (Nationality of Spain)+"companies"

At step E, the tokenizer 112 tokenizes the n-gram of characters and can obtain a context-based vocabulary from the context engine 110. In certain embodiments step D and step E can take place at the same time (which is one reason the system can work so fast).

The system has the ability of reaching out into another module to do some additional work (e.g., if the system needs to deal with out-of-vocabulary words), but normally, no additional network requests/components are needed at this stage to get the meaning of the vocabulary. In one implementation, when the tokenizer is built, the system not only has the list of vocabulary, but also the interpretation associated with each vocabulary word.

The tokens that the tokenizer 112 emits contain both the sequence of characters that correspond to each token as well as their meaning. In the example above, the "United States of America" would correspond to a single token. The tokenizer can attach additional meta information to the token to represent the meaning of the token. An example of such meta information is a list of attributes that specify that the sequence of characters ("United States of America") corresponds to an entity, that the entity type is a geography, and it can contain a human-friendly display name as well as relevant database identifier(s) associated with the United States.

A context engine in its most naive form is a centralized registry for different groupings of vocabularies. For example, a context engine may contain a vocabulary for geographies. This vocabulary of geographies could include a list of all the countries in the world, together with all the known aliases and canonical names of these countries and the database identifiers that correspond to these geographies. Depending on the application, the geographic vocabulary can be expanded to include states, counties, and cities. The context engine can also provide a vocabulary for conjunctions (e.g., "and" and "or").

The context engine 110 is leveraged to assemble both the tokenizer 112 and grammar review engine 114 (explanation of the grammar review engine 114 is provided below). When the tokenizer 112 is assembled using both the geographies and the conjunctions vocabulary, the tokenizer is able to attach different meanings for a character sequence, e.g., for the character sequence "or." Specifically, two tokens will be emitted for that character sequence, one token for the interpretation of "or" as a conjunction, while the other token for the interpretation of "or" as the state of Oregon (containing other meta information such as Oregon's database identifier, etc). Similarly, if the geography vocabulary contains a list of both countries and states, then the tokenizer will be able to associate two different meanings with the character sequence "georgia"—one meaning associated with the US state and another meaning associated with the country.

The tokenizer 112 continues to tokenize the sentence, keeping track of possible interpretations. The tokenizer uses a graph traversal algorithm (e.g., breadth-first or depth-first search) in some cases with minor modifications to keep track of a specified number of sequences. The tokenization step works by scanning the sentence left to right, repeating the following steps until the sentence is fully read:

Identify all the prefixes at the beginning of the sentence;
For each valid prefix, identify all possible interpretations;
For each interpretation, produce a token and attach it to token sequence associated with the current tokenization path; and,
Strip the prefixes from the original sentence and repeat with the remainder(s) of the sentence.

For example, if the original sentence was "companies in Georgia", after tokenizing the sentence, we should end up with two token sequences. One token sequence corresponds to: ['companies', 'in', 'Georgia' (State)]. The second token sequence would correspond to: ['companies', 'in', 'Georgia' (Country)].

At step F, the tokenizer forwards at least one token sequence to the grammar review engine 114 to apply grammatical rules to each token sequence. At this point, the NLIRTF system has identified the individual words in the original n-gram of characters and the meaning (one or more) of each individual word. Now, at step F, the NLIRTF system determines whether the sentence as a whole is grammatically valid and, if so, the NLIRTF system translates the token sequence into a machine representation. The grammar review can be based on both grammar and semantics.

Consider the sentence: "top five US companies." After tokenization an implementation of the natural language processing system described in this specification provides a list of 4 tokens containing the following information (shown in pseudo code):

[
Token(text=top, meaning=sort direction descending),
Token(text=five, meaning=number 5),
Token(text=us, meaning=country with the database identifier for the country),
Token(text=companies, meaning=entity class of companies)
]
. . .

After the grammar step, the system can produce machine instructions (e.g., graphql, SQL or an internal representation):
. . .
directives=[
SelectEntityClass('companies'),
Filter('domicile', 'equals', 'US'),
SortBy(Attribute='Market-cap', direction='descending'),
SelectRows(number=5)
]
. . .

In other words, the grammar review engine can perform a translation step from tokens to a machine representation.

The grammar review engine 114 can include a list of pattern detectors and can associate each pattern detector with a processor. For example, a pattern detector can detect the pattern [not] [geography]', and pass the appropriate tokens to a processor which will translate them into a single geography filter.

When the grammar review engine 114 is assembled, it leverages information from the context engine 110 to automatically expand the list of pattern detectors. For example, in order to expose a way of filtering based on various categorical values (e.g., "large-cap" or "private"), these keywords are registered in the relevant vocabularies. These vocabularies are then used when building the tokenizer 112. In addition, these vocabularies are used to automatically expand the list of pattern detectors to cover all registered categorical values. This allows a user to write a single pattern detector of the form: [negation] [categorical]' which will automatically cover variants like: 'not large-cap', 'non-private', 'not in information technology'.

While using a list of pattern detectors is one particular implementation, one can generalize the description. The grammar review step can make two conclusions: 1) whether the sentence is grammatically valid; and 2) if so, translation of the sentence into machine representation, i.e., the system can use a list of pattern detectors based on regular languages since these are easy to create. However, a system can also use a context-free grammar (CFG). Working with CFGs allows the system to more naturally work in recursion, which allows the system to expose compound statements. For example, "us companies with revenue>MSFT revenue" or "companies with ((eps >0) &*((revenue<$5 mil) OR (market-cap>30 billion))). After the grammatical review, one additional system can be invoked which attaches a likelihood to each possible sequence (this option results in a disambiguation system). In one implementation, the grammar review engine can determine how to combine words together and which words can be combined together.

During the processing step, the grammar review engine 114 applies each rule inside the grammar sequentially. Each rule identifies the tokens that match its pattern (if any) and translates those tokens into the appropriate machine representation. In one embodiment, if any of the tokens present in the original sequence are not successfully processed, then the sentence is considered grammatically invalid. For example, if the original sentence was: "non us companies", after Step D, the NLIRTF system could analyze the token sequence to arrive at the following: 'non' (negation), 'us' (geography), 'companies' (entity type). The NLIRTF system can first use the grammar review engine 114 to validate the sentence. Then, the NLIRTF system can merge 'non' with 'us' to produce a geography filter (that excludes the United States). The NLIRTF system can translate valid token sequences into machine representation (ready to be executed e.g., by a database, a service or an API).

At step F, the grammar review engine 114 performs a grammar review (e.g., a grammar and a semantic review) and at step G passes at least one valid token sequence to the user interface engine 116. At step H, the user interface engine forwards, to a user device 102, interpretation data for at least one valid token sequence, assuming at least one valid token sequence exists. The interpretation data is displayed to the user to surface to the user the way in which the input sentence was interpreted by the NLIRTF system. Thus, the NLIRTF system gives the user transparency into how the NLIRTF system is interpreting the user's input.

In one embodiment, the tokenizer can use a trie data structure together with a custom grammar to achieve both auto-completion of a current word being entered by a user and/or also a suggestion of a next word or words to complete the query. Auto-completion of a current word being entered by a user and/or auto-suggestion of the complete query are useful steps for teaching a user how to use a natural language engine correctly. The latency of the system can be <500 ms. In addition, the NLIRTF system can be run in "reverse" such that when a user clicks on any user interface components (buttons/filters), the engine writes a query in natural language that corresponds to the configuration of the user interface component.

Figure 2A:
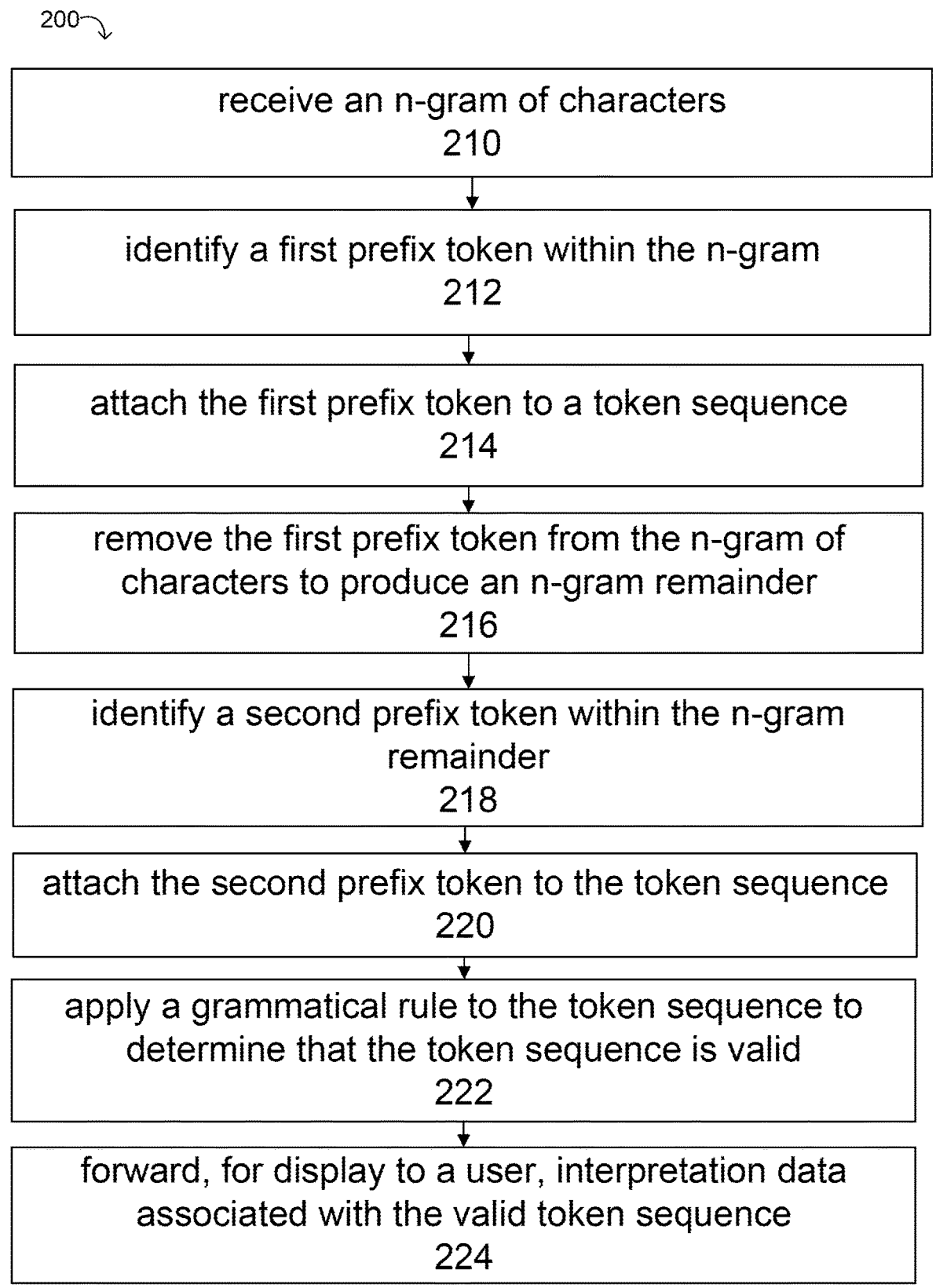
FIG. 2A is a flow chart of an example of a method for providing a natural language interface with real-time feedback.

FIG. 2A is a flowchart of an example process 200 for a natural language interface with real-time feedback. For convenience, the process 200 will be described as being performed by a system of one or more computers, located in one or more locations, and programmed appropriately in accordance with this specification. For example, a NLIRTF system, e.g., the NLIRTF system 100 of FIG. 1, appropriately programmed, can perform the process 200.

The process 200 can include: receiving 210 an n-gram of characters; identifying 212 a first prefix token within the n-gram of characters; attaching 214 the first prefix token to a token sequence; removing 216 the first prefix token from the n-gram of characters to produce an n-gram remainder; identifying 218 a second prefix token within the n-gram remainder; attaching 220 the second prefix token to the token sequence; applying 222 a grammatical rule to the token sequence to determine that the token sequence is valid; and forwarding 224, for display to a user, interpretation data for the valid token sequence.

The system often identifies more than one token from the prefix, allowing the system to keep track of ambiguity. The tokenizer can emit multiple tokens (e.g., each with a different interpretation) and all of which share at least a part of the prefix. Examples of such a situation: Consider both ' oil' and 'oil & exploration' were two different industries. When analyzing the sentence: "oil & exploration companies," during step 212 the tokenizer would emit two tokens: 1) 'oil' (oil industry) followed by the remainder ('& exploration companies'), and 2) 'oil & exploration' (oil and exploration industry) followed by the remainder ('companies'). Each token would be attached to its own token sequence.

Figure 2B:
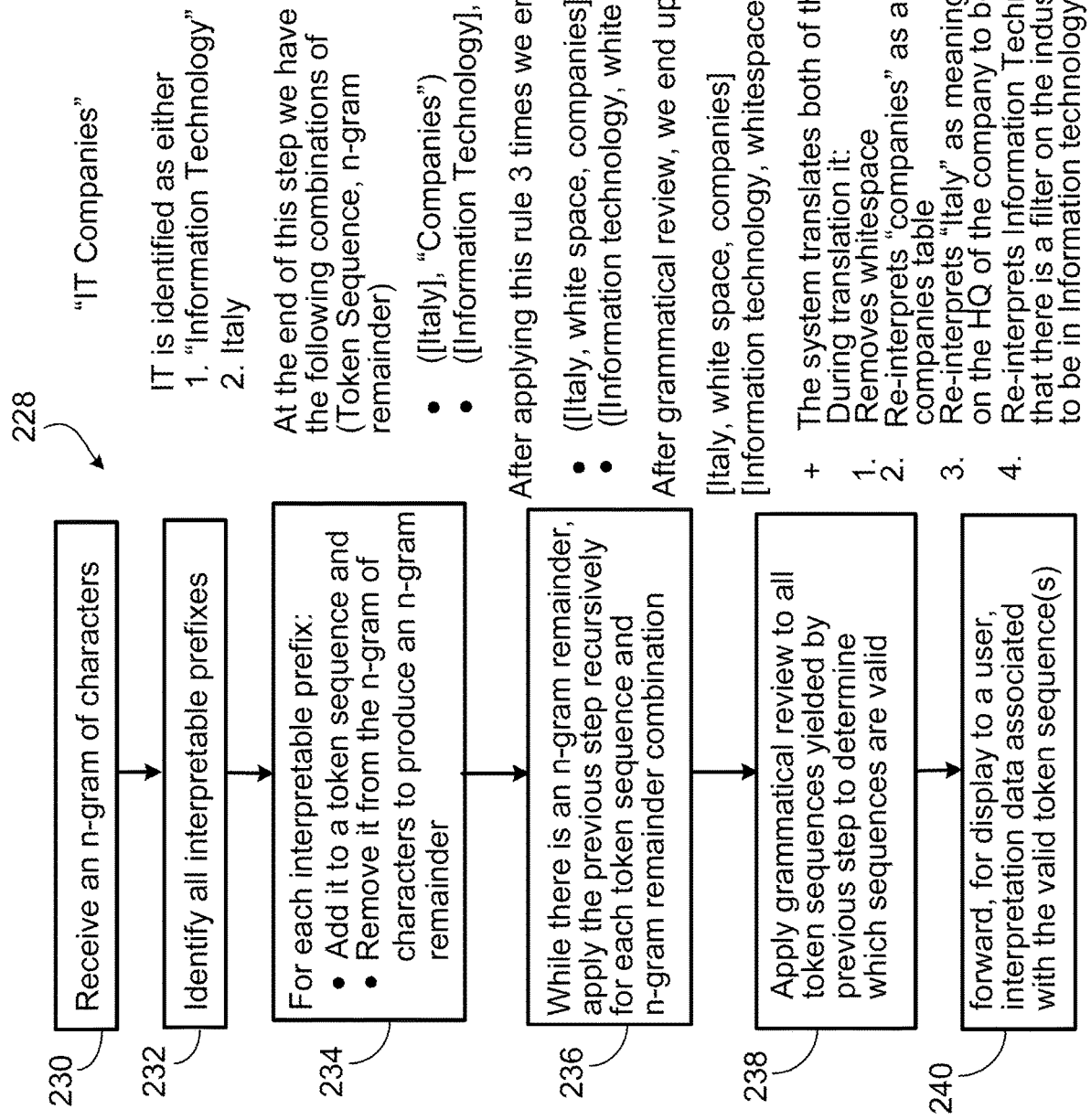
FIG. 2B is a flow chart of another example of a method for providing a natural language interface with real-time feedback.

FIG. 2B is a flowchart of another exemplary process 200 for a natural language interface with real-time feedback. The process 228 can include: receiving 230 an n-gram of characters; identifying 232 interpretable prefixes, e.g., all interpretable prefixes; For each interpretable prefix, adding 234 the prefix to a token sequence and removing the prefix from the n-gram of characters to produce an n-gram remainder; while there is a n-gram remainder, applying 236 the previous step (i.e., step 234) recursively for each token sequence and n-gram remainder combination; applying 238 grammatical review to token sequences yielded by step 236 to determine which sequences are valid; and forwarding 240, for display to a user, interpretation data associated with at least one valid token sequence.

As an example, an n-gram can be "IT Companies." At step 232, IT is identified as either "information technology" or "Italy." At the end of step 234, the system produces the following combinations of token-sequence and n-gram remainder: ([Italy], "Companies") and ([Information Technology], "Companies"). After step 236, the system produces, ([Italy, white space, companies], " ") and ([Information Technology, white space, companies], " "). After grammatical review in step 238, the system produces two valid token sequences: [Italy, white space, companies] and [Information Technology, white space, companies]. The system can translate these valid token sequences into machine instructions by: removing whitespace; re-interpreting "companies" as an instruction to select the companies table; re-interpreting "Italy" as meaning that there is a filter on a headquarters category of company information set to place the headquarters in Italy; re-interpreting "Information Technology" as meaning that there is a filter on an industry category of company information set to select the industry of the company to be information technology.

FIGS. 3A-3B illustrate an example of a natural language query 302a, 302b with a display 304 providing feedback to a user regarding how the query is being interpreted. In FIG. 3A, a user has submitted a search query 302a for "chip companies." In response, the NLIRTF system has forwarded interpretation data to the user's computing device and the user's computing device is displaying that interpretation data in display 304. In the illustrated example, the context is a search for companies having certain attributes and the display 304 includes company screener 306 criteria 308 where the criteria is that an industry attribute 310 is set to "semiconductors."

In FIG. 3B, a user has submitted a search query 302b for "american chip companies." In response, the NLIRTF system has forwarded interpretation data to the user's computing device and the user's computing device is displaying that interpretation data in display 304. In the illustrated example, the context is a search for companies having certain attributes and the display 304 includes company screener 306 criteria 308 where the criteria is that an industry attribute 310 is set to "semiconductors" and the geography attribute 312 is set to "United States of America."

FIGS. 4A-4D illustrate another example of a natural language query with a display providing feedback to a user regarding how the query is being interpreted. In FIG. 4A, a user has submitted a search query 402a for "eps of non-american chip companies." In response, the NLIRTF system has forwarded interpretation data to the user's computing device and the user's computing device is displaying that interpretation data in display 404. In the illustrated example, the context is a search for companies having certain attributes and the display 404 includes company screener 406 criteria 408 where the criteria is that an industry attribute 410 is set to "semiconductors" and the geography attribute 412 is set to not in "United States of America." The display 404 also includes an additional report field 414 of diluted earnings per share which is how the NLIRTF system interpreted the acronym "eps."

In FIG. 4B, a user has submitted a search query 402b for "stock price, eps of non-american chip companies." In response, the NLIRTF system has forwarded interpretation data to the user's computing device and the user's computing device is displaying that interpretation data in display 404. Again, the context is a search for companies having certain attributes and the display 404 is the same as in FIG. 4A, except that the display also includes an additional report field 414 of last close price (last close price is the NLIRTF system's interpretation of "stock-price").

In FIG. 4C, a user has submitted a search query 402c for "stock price, eps, market-cap of non-american chip companies." In response, the NLIRTF system has forwarded interpretation data to the user's computing device and the user's computing device is displaying that interpretation data in display 404. Again, the context is a search for companies having certain attributes and the display 404 is the same as in FIG. 4B, except that the display also includes an additional report field 414 of last close market cap (last close market cap is the NLIRTF system's interpretation of "market-cap").

In FIG. 4D, a user has submitted a search query 402b for "stock price, eps of non-american chip companies with positive revenues." In response, the NLIRTF system has forwarded interpretation data to the user's computing device and the user's computing device is displaying that interpretation data in display 404. Again, the context is a search for companies having certain attributes and the display 404 is the same as in FIG. 4C, except that the display also includes an additional criteria 408 of total revenues>0 (total revenues>0 is the NLIRTF system's interpretation of "with positive revenue").

Figure 5:
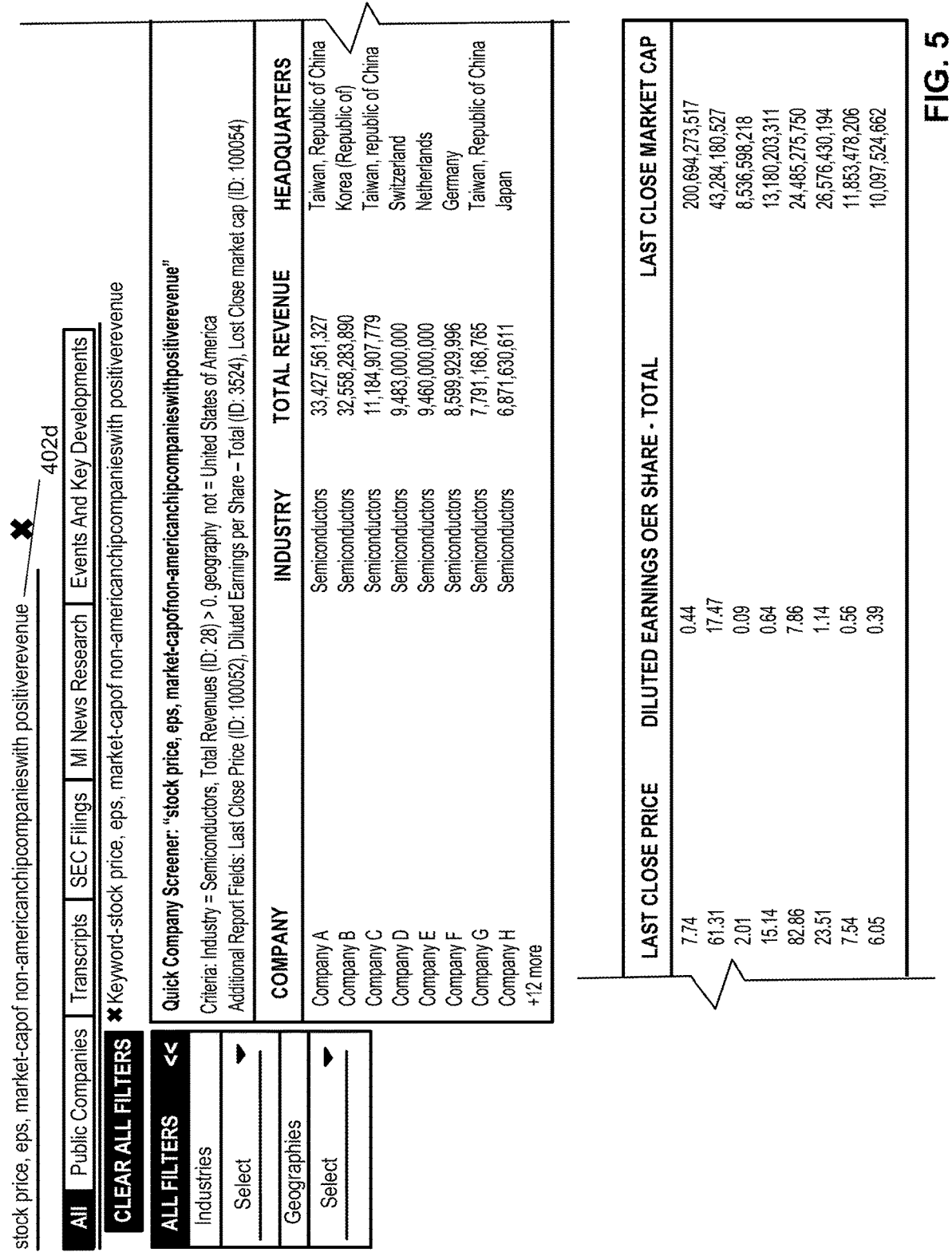
FIG. 5 illustrates an example of results provided in response to the natural language query of FIG. 4D.

FIG. 5 illustrates an example of results provided in response to the natural language query 402d of FIG. 4D. The illustrated results are in tabular form and include company name, industry, total revenue, headquarters, last close price, diluted earnings per share and last close market cap. In addition, the user interface of the results page can provide a set of filters, such as industry and geography filters, that a user can select to filter the results.

Innovative aspects of embodiments of a NLIRTF system described in this specification include the following. An NLIRTF system can associate a word in the vocabulary with all various meanings. The underlying engine keeps track of possible meanings associated with a sequence of characters and is capable of disambiguating them based on context. Disambiguation can occur in 3 ways: 1) the disambiguation system can run multiple independent systems in parallel, with each independent system responsible for analyzing a specific domain/context; 2) the grammar review engine can invalidate certain interpretations (this is a disambiguation); and 3) a downstream layer can rank various interpretations according to their likelihood and then forward all of them, or a subset of them, to the user.

An NLIRTF system can keep track of ambiguities in the interpretation of a tokenized sequence as well as recognize out-of-sample vocabulary. These features allow a user to see real-time feedback on how the system is resolving/recognizing entities and grammatical structure. Additionally, NLIRTF systems and methods produce an innovative output in the form of overlapping matches, as opposed to a logical tree structure. NLIRTF systems and methods provide on-the-go feedback, which exposes entity resolution and grammatical parsing to the user in real-time, as well as the understanding of grammatical structure.

The NLIRTF system described in this specification exposes configuration layers (e.g., vocabularies and lists of pattern detectors to use). The configuration layers can in principle be exposed via a user interface to appropriately trained personnel. These exposed configuration layers can allow non-technical but appropriately trained personnel to use a user interface to configure a query engine to analyze new types of queries.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including, by way of example, a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

An electronic document, which for brevity will simply be referred to as a document, may, but need not, correspond to a file. A document may be stored in a portion of a file that holds other documents, in a single file dedicated to the document in question, or in multiple coordinated files.

In this specification, the term "database" will be used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   receiving by a computing device an n-gram of characters;
   identifying a first prefix token within the n-gram of characters;
   identifying a plurality of possible interpretations of the n-gram of characters based at least in part on the first prefix token;
   for each possible interpretation, attaching the first prefix token to a token sequence associated with a tokenization path;
   removing the first prefix token from the n-gram of characters to produce an n-gram remainder;
   identifying a second prefix token within the n-gram remainder using a tokenizer;
   identifying a plurality of remaining possible interpretations based on the first prefix token and the second prefix token;
   for each remaining possible interpretation attaching the second prefix token to a token sequence;
   applying grammatical rules to each token sequence to determine that each token sequence is valid, the applying step producing valid token sequences;
   translating at least two valid token sequences into machine instructions;
   forwarding, for display to a user, search query interpretation data for the at least two valid token sequences, the search query interpretation data comprising search criteria and at least one report field, the search query interpretation data based at least in part on the machine instructions; and
   receiving an indication of a selection of one of the at least two valid token sequences corresponding to the forwarded search query interpretation data, the selection determining a selected token sequence.

2. The method of claim 1; wherein the method further comprises initiating a search based at least in part on the selected token sequence.

3. The method of claim 2; wherein the method further comprises providing results in response to a natural language query interpreted using the selected token sequence.

4. The method of claim 1, wherein the tokenizer is a dynamic tokenizer.

5. The method of claim 1, wherein the first prefix token is a plurality of items and the items can be phonemes, syllables, letters, or words.

6. The method of claim 1, wherein the method further comprises suggesting how to complete the n-gram of characters.

7. The method of claim 1, wherein the method further comprises determining a context for the n-gram of characters.

8. The method of claim 7, wherein the method further comprises assembling a plurality of vocabularies and wherein determining a context for the n-gram of characters comprises determining a vocabulary from the plurality of vocabularies based at least in part on the context for the n-gram of characters.

9. The method of claim 1, wherein the method further comprises:
   a) removing a most-recently determined prefix token from the n-gram remainder to produce a reduced n-gram remainder;
   b) identifying a further prefix token within the reduced n-gram remainder using a tokenizer; c) identifying a plurality of remaining possible interpretations based on the prefix tokens; and
   repeating steps (a) to (c).

10. A system comprising:
    one or more computers and one or more storage devices on which are stored instructions that are operable, when executed by the one or more computers, to cause the one or more computers to perform operations comprising:
    receiving by a computing device an n-gram of characters;
    identifying a first prefix token within the n-gram of characters;
    identifying a plurality of possible interpretations of the n-gram of characters based at least in part on the first prefix token;
    for each possible interpretation, attaching the first prefix token to a token sequence associated with a tokenization path;
    removing the first prefix token from the n-gram of characters to produce an n-gram remainder;
    identifying a second prefix token within the n-gram remainder using a tokenizer;

identifying a plurality of remaining possible interpretations based on the first prefix token and the second prefix token;
for each remaining possible interpretation attaching the second prefix token to a token sequence;
applying grammatical rules to each token sequence to determine that each token sequence is valid, the applying step producing valid token sequences;
translating at least two valid token sequences into machine instructions;
forwarding, for display to a user, search query interpretation data for the at least two valid token sequences, the search query interpretation data comprising search criteria and at least one report field, the search query interpretation data based at least in part on the machine instructions; and
receiving an indication of a selection of one of the at least two valid token sequences corresponding to the forwarded search query interpretation data, the selection determining a selected token sequence.

11. The system of claim 10, wherein the method further comprises initiating a search based at least in part on the selected token sequence.

12. The system of claim 11, wherein the method further comprises providing results in response to a natural language query interpreted using the selected token sequence.

13. The system of claim 10, wherein the tokenizer is a dynamic tokenizer.

14. The system of claim 10, wherein the first prefix token is a plurality of items and the items can be phonemes, syllables, letters, or words.

15. The system of claim 10, wherein the operations further comprise suggesting how to complete the n-gram of characters.

16. The system of claim 10, wherein the operations further comprise determining a context for the n-gram of characters.

17. The system of claim 16, wherein the operations further comprises assembling a plurality of vocabularies and wherein determining a context for the n-gram of characters comprises determining a vocabulary from the plurality of vocabularies based at least in part on the context for the n-gram of characters.

* * * * *